(12) United States Patent
Li et al.

(10) Patent No.: US 9,391,515 B2
(45) Date of Patent: Jul. 12, 2016

(54) BUCK CIRCUIT

(71) Applicant: Cisco Technology, Inc., San Jose, CA (US)

(72) Inventors: Yang Li, San Jose, CA (US); Haitao Liu, Shanghai (CN); Yingchun Ru, Shanghai (CN); Qiuhua Zhu, Shanghai (CN); Kan Chiu Seto, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/082,248

(22) Filed: Nov. 18, 2013

(65) Prior Publication Data

US 2015/0137788 A1  May 21, 2015

(51) Int. Cl.
*H02M 3/07* (2006.01)
*H02M 3/158* (2006.01)
*H02M 3/155* (2006.01)
*H02M 3/156* (2006.01)
*H02M 1/00* (2006.01)

(52) U.S. Cl.
CPC ............... *H02M 3/158* (2013.01); *H02M 3/07* (2013.01); *H02M 3/156* (2013.01); *H02M 2001/007* (2013.01); *H02M 2003/1557* (2013.01)

(58) Field of Classification Search
USPC .......................................... 323/315, 280–285
See application file for complete search history.

(56) References Cited

U.S. PATENT DOCUMENTS

| | | | | |
|---|---|---|---|---|
| 4,600,982 | A * | 7/1986 | Graham | H02M 7/2176 323/272 |
| 8,115,536 | B2 * | 2/2012 | Snelten | 327/538 |
| 8,350,543 | B2 * | 1/2013 | Loikkanen et al. | 323/259 |
| 2009/0278520 | A1 * | 11/2009 | Perreault | H02M 3/07 323/282 |
| 2011/0102063 | A1 * | 5/2011 | Zeller | H03G 1/0052 327/520 |
| 2011/0181261 | A1 * | 7/2011 | Kalechshtein | H02M 1/34 323/284 |
| 2013/0052969 | A1 * | 2/2013 | Seshita | 455/83 |

* cited by examiner

*Primary Examiner* — Timothy J Dole
*Assistant Examiner* — Bryan R Perez
(74) *Attorney, Agent, or Firm* — Merchant & Gould P.C.

(57) ABSTRACT

An apparatus may be provided. The apparatus may comprise a first circuit portion, a second circuit portion, and a third circuit portion. The first circuit portion may comprise a voltage supply having an input voltage level ($V_{in}$) and a first switch. The second circuit portion may comprise a plurality of parallel paths. The third circuit portion may comprise a second switch and a third switch. The plurality of parallel paths may supply a portion of the input voltage level when the first switch is open, the second switch is closed, and the third switch is open.

17 Claims, 5 Drawing Sheets

BUCK CIRCUIT

TECHNICAL FIELD

The present disclosure relates generally to power supplies.

BACKGROUND

A power supply is a device that supplies electric power to an electrical load. The term is most commonly applied to electric power converters that convert one form of electrical energy to another, though it may also refer to devices that convert another form of energy (e.g., mechanical, chemical, solar) to electrical energy. A regulated power supply is one that controls the output voltage or current to a specific value. The controlled value is held nearly constant despite variations in either load current or the voltage supplied by the power supply's energy source.

A power supply may be implemented as a discrete, stand-alone device, or as an integral device that is hardwired to its load. Examples of the latter case include the low voltage DC power supplies that are part of desktop computers and consumer electronics devices.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
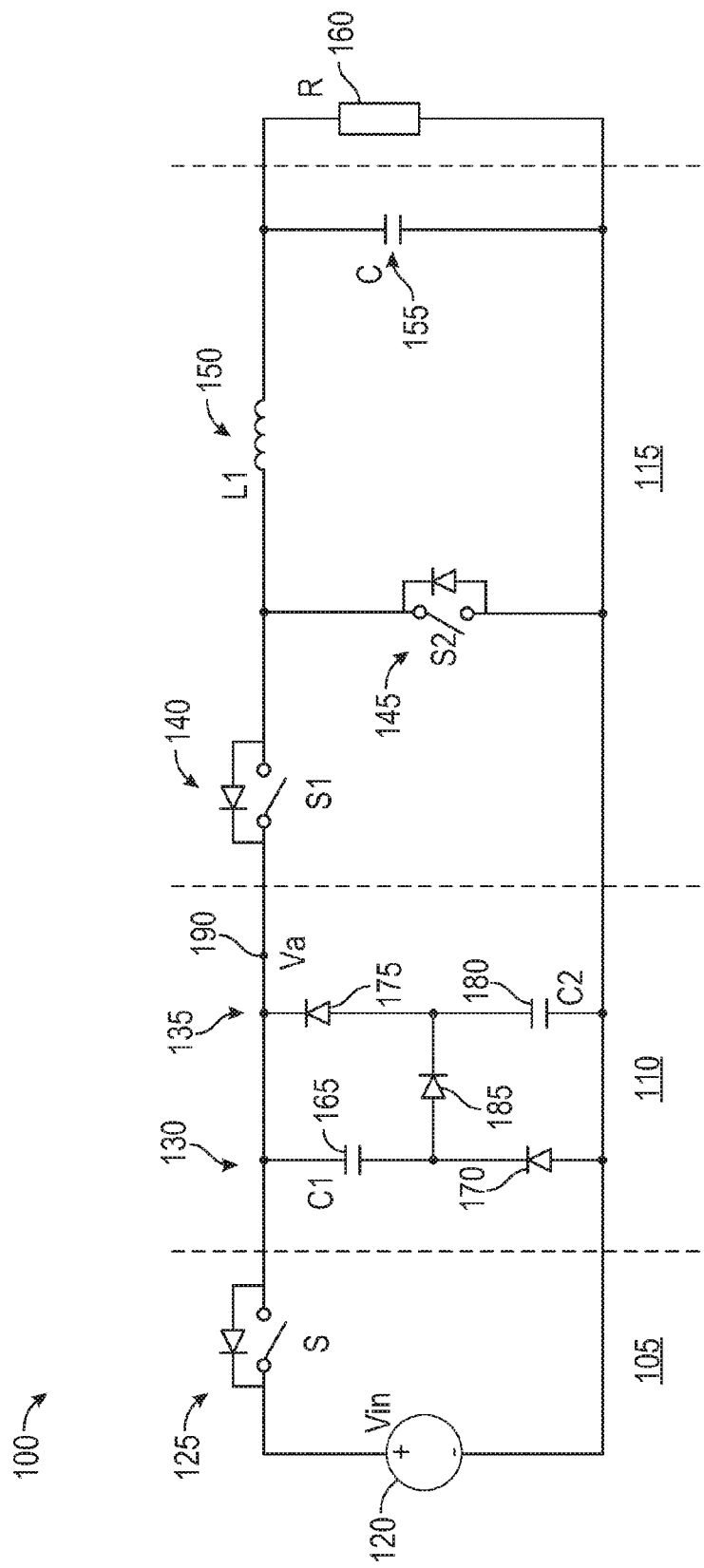
FIG. 1 shows a circuit.

An apparatus may be provided. The apparatus may comprise a first circuit portion, a second circuit portion, and a third circuit portion. The first circuit portion may comprise a voltage supply having an input voltage level ($V_{in}$) and a first switch. The second circuit portion may comprise a plurality of parallel paths. The third circuit portion may comprise a second switch and a third switch. The plurality of parallel paths may supply a portion of the input voltage level when the first switch is open, the second switch is closed, and the third switch is open.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A switched-mode power supply (switching-mode power supply, SMPS, or switcher) is an electronic power supply that incorporates a switching regulator to convert electrical power efficiently. Like other power supplies, a SMPS transfers power from a source, like mains power, to a load, such as a personal computer, while converting voltage and current characteristics.

Unlike a linear power supply, the pass transistor of a switching-mode supply may continually switch between low-dissipation, full-on and full-off states, and spends very little time in the high dissipation transitions, which minimizes wasted energy. Ideally, a switched-mode power supply may dissipate no power. Voltage regulation may be achieved by varying the ratio of on-to-off time.

In contrast, a linear power supply may regulate the output voltage by continually dissipating power in the pass transistor. This higher power conversion efficiency is an important advantage of a switched-mode power supply. Switched-mode power supplies may also be substantially smaller and lighter than a linear supply due to the smaller transformer size and weight.

Switching regulators may be used as replacements for linear regulators when higher efficiency, smaller size, or lighter weight are desired. They are, however, more complicated; their switching currents can cause electrical noise problems if not carefully suppressed, and simple designs may have a poor power factor.

A buck converted may be used in a power supply. A buck converter may comprise a step-down DC to DC converter. Its design may be similar to a step-up boost converter, and like the boost converter, it may be a switched-mode power supply that uses two switches (a transistor and a diode), an inductor, and a capacitor.

One way to reduce the voltage of a DC supply may be to use a linear regulator. However, linear regulators may waste energy as they operate by dissipating excess power as heat. Buck converters, on the other hand, can be more efficient making them useful for tasks such as converting the main voltage in a computer (e.g., 12 V in a desktop, 12-24 V in a laptop) down to the 0.8-1.8 volts needed by a computer processor.

The basic operation of the buck converter has the current in an inductor controlled by two switches (usually a transistor and a diode). In an idealized converter, all the components may be considered to be perfect. Specifically, the switch and the diode may have zero voltage drop when on and zero current flow when off and the inductor may have zero series resistance. Further, it is assumed that the input and output voltages do not change over the course of a cycle (this would imply the output capacitance as being infinite).

In a conventional buck circuit, the input voltage may be limited if the output voltage is fixed because it may be difficult to make the system stable if the duty cycle is small. A conventional buck circuit may work for a desired output voltage of 1V and an input voltage to no more than 10V as an example. If, however, the input voltage is 20V or higher, the conventional process may be to add another buck to the conventional buck circuit to step down the input voltage from 20V to 10V. The added buck may require extra components and cost and may increase the circuit size. Embodiments of the disclosure may provide a buck circuit that may step the input voltage down (e.g., one-half, one-third, one-fourth, etc.)

without the need for an additional buck to a level that may support a stable duty cycle value.

FIG. 1 shows a circuit 100. As shown in FIG. 1, circuit 100 may comprise a first circuit portion 105, a second circuit portion 110, and a third circuit portion 115. First circuit portion 105 may comprise a voltage supply 120 and a first switch 125. First switch 125 may comprises, but is not limited to, a metal-oxide-semiconductor field-effect transistor (MOSFET). Voltage supply 120 may supply an input voltage ($V_{in}$) to circuit 100.

Second circuit portion 110 may comprise a plurality of parallel paths. The plurality of parallel paths may comprise, but are not limited to, a first parallel path 130 and a second parallel path 135. Third circuit portion 115 may comprise a second switch 140, a third switch 145, an inductor 150, and a load capacitor 155. Circuit 100 may serve a load 160 connected, for example, across load capacitor 155. Second switch 140 and third switch 145 may comprise, but are not limited to, metal-oxide-semiconductor field-effect transistors (MOSFETs).

First parallel path 130 may comprise a first parallel path capacitor 165 and a first parallel path semiconductor (e.g., a first parallel path diode 170). Second parallel path 135 may comprise a second parallel path capacitor 180 and a second parallel path semiconductor (e.g., a second parallel path diode 175). A first connector diode 185 may connect first parallel path 130 and second parallel path 135. A voltage (Va) may exist at point 190 in circuit 100.

Figure 2:
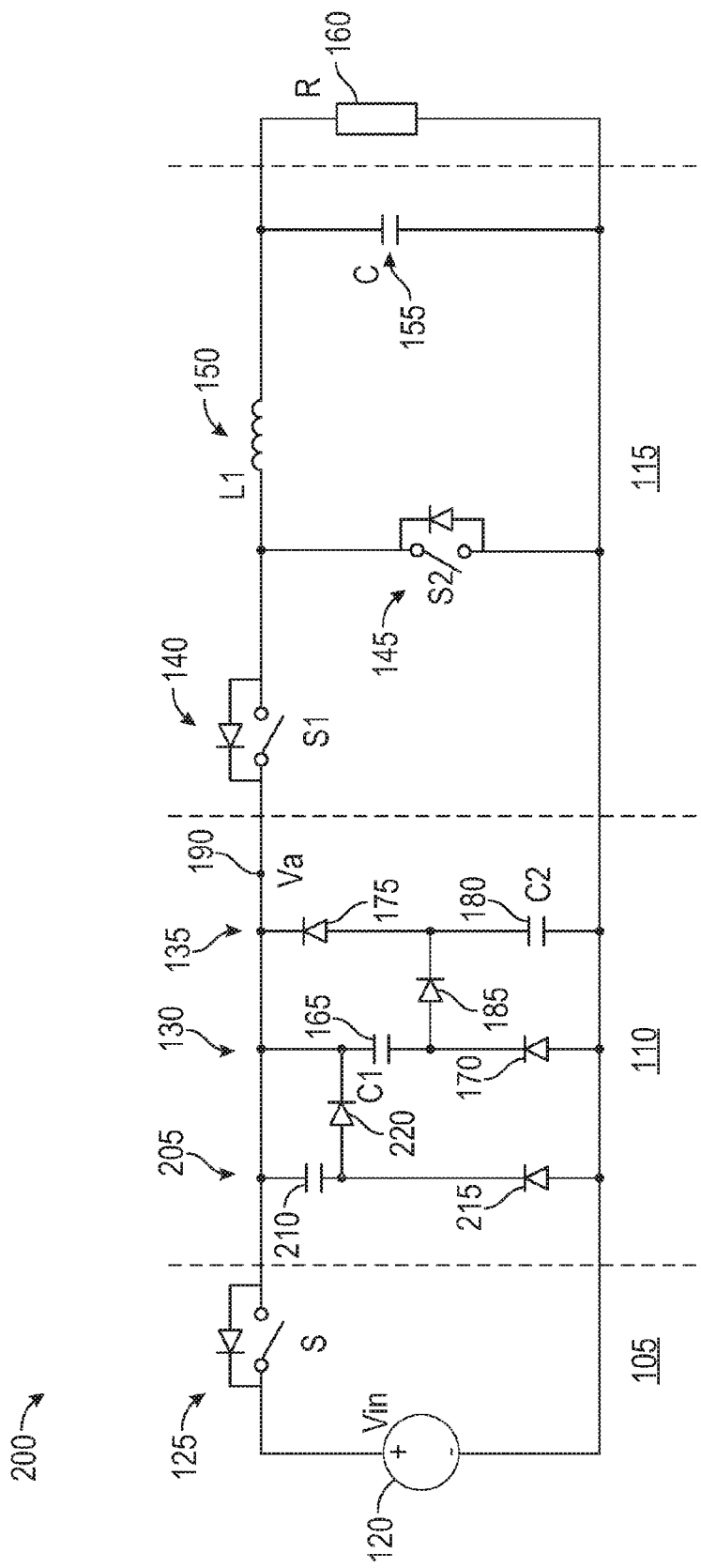
FIG. 2 shows a circuit.

FIG. 2 shows a circuit 200. As shown in FIG. 2, circuit 200 may be similar to circuit 100, however, in addition to first parallel path 130 and second parallel path 135, the plurality of parallel paths of second circuit portion 110 may further comprise a third parallel path 205. Third parallel path 205 may comprise a third parallel path capacitor 210 and a third parallel path semiconductor (e.g., a third parallel path diode 215). A second connector diode 220 may connect first parallel path 130 and third parallel path 205. Consistent with embodiments of the disclosure, circuit 100 and circuit 200 may comprise any number of parallel paths and is not limited to two or three.

Consistent with embodiments of the disclosure, an output voltage ($V_o$) may be supplied across load capacitor 155. The output voltage ($V_o$) may be ($V_{in}$/n)*D where n is a number of parallel paths comprising the plurality of parallel paths and D is a duty cycle. For example, as shown in the configuration of FIG. 1, n may comprise 2 because there are 2 parallel paths in the plurality of parallel paths. Moreover, as shown in the configuration of FIG. 2, n may comprise 3 because there are 3 parallel paths in the plurality of parallel paths. Notwithstanding, consistent with embodiments of the disclosure, n may comprise any number and is not limited to 2 or 3 at least because embodiments of the disclosure may have any number of parallel paths in the plurality of parallel paths.

Figure 3:
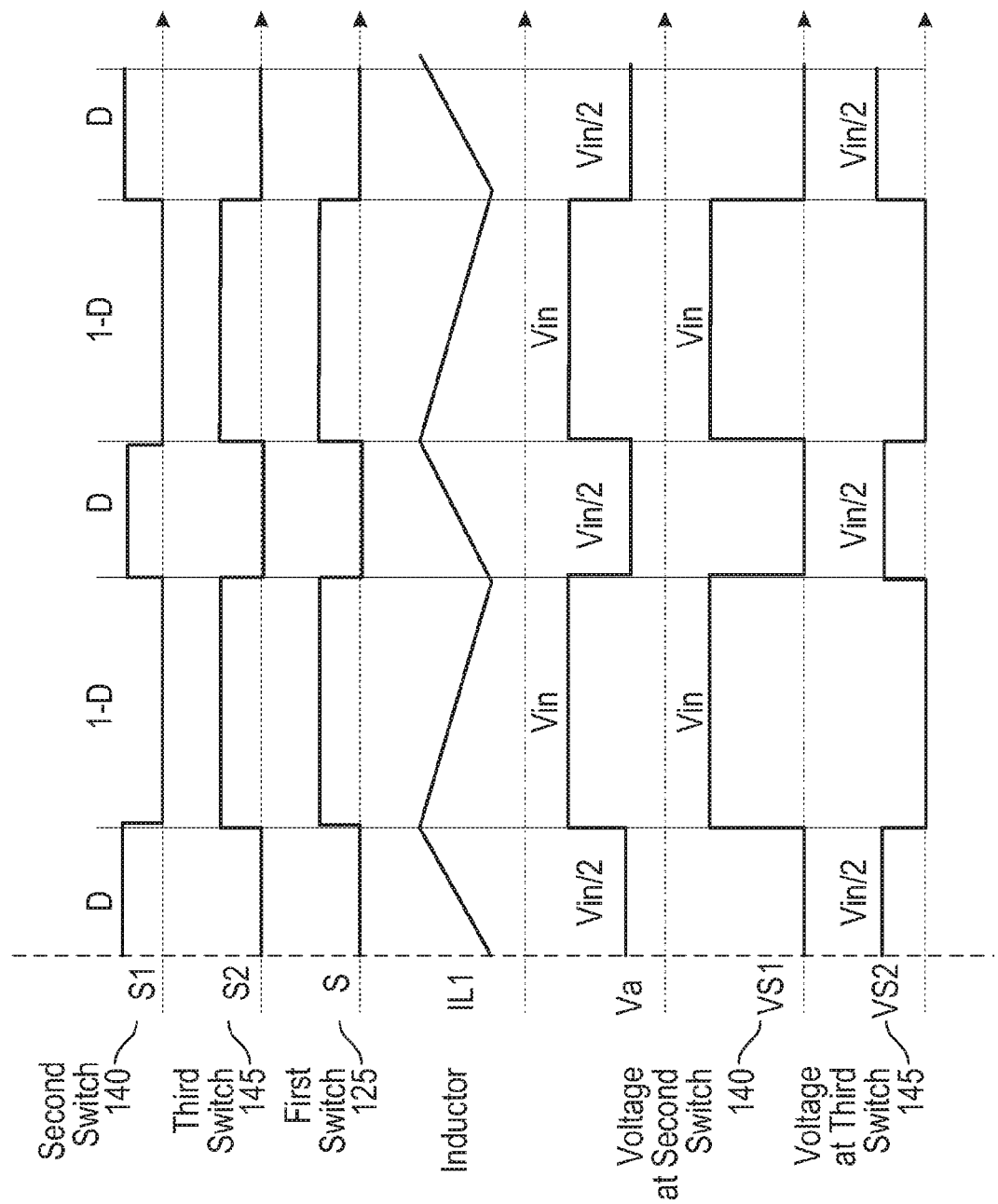
FIG. 3 shows a state of various elements in a circuit.
Figure 4:
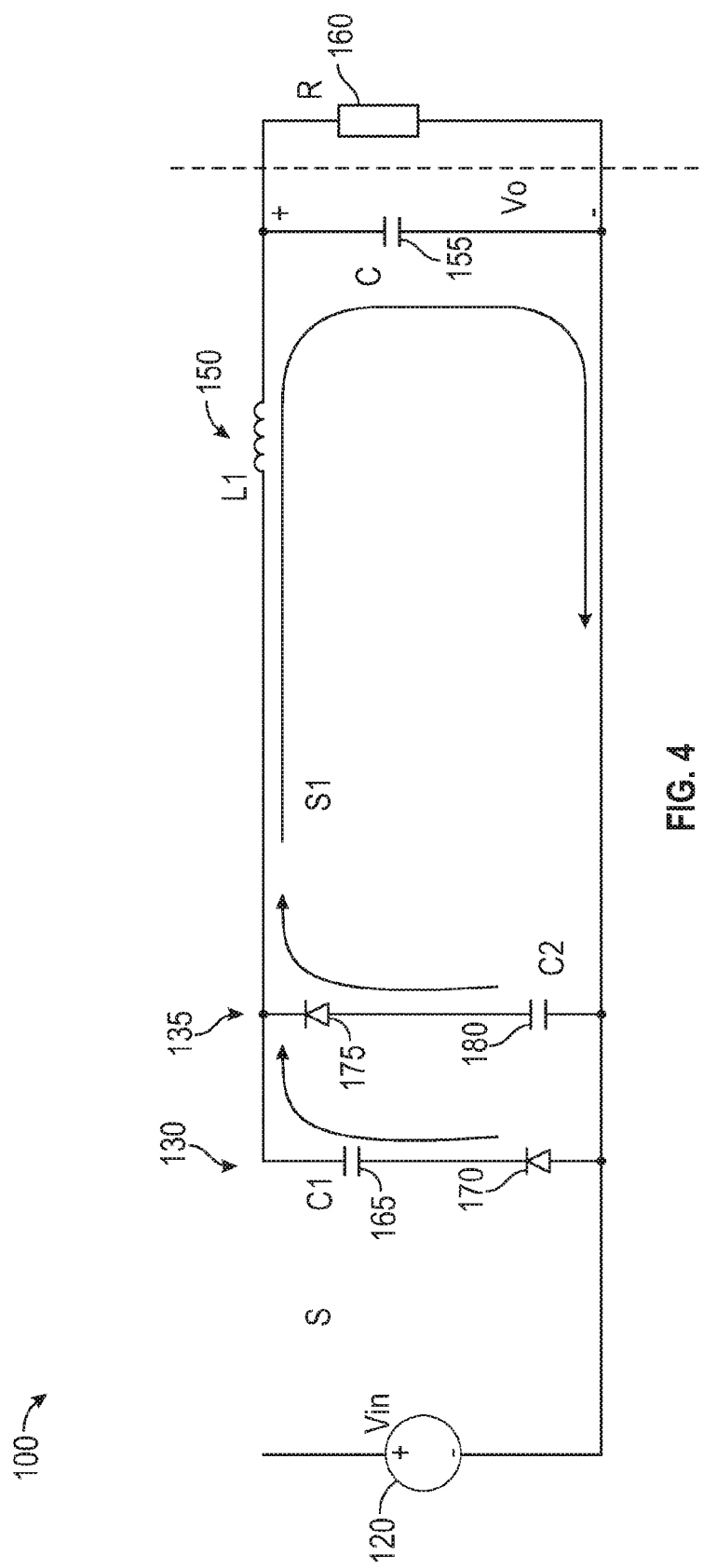
FIG. 4 shows a circuit in a given switch configuration.

As shown in FIG. 3, first switch 125, second switch 140, and third switch 145, may be operated at duty cycle D. For example, for a time period D, first switch 125 may be open, second switch 140 may be closed, and third switch 145 may be open. FIG. 4 shows circuit 100 in this switching configuration. In the FIG. 4 switching configuration, inductor 150 may begin to charge. First parallel path capacitor 165 and second parallel path capacitor 180 may discharge to provide a voltage of Va=Vin/2 at point 190. The voltage across second switch 140 may go to zero and the voltage across third switch 145 may be Vin/2. If the number of parallel paths in second circuit portion 110 comprises 3 (e.g., n=3 as in FIG. 2), first parallel path capacitor 165, second parallel path capacitor 180, and third parallel path capacitor 210 may discharge to provide a voltage of Va=Vin/3 at point 190. In this three parallel path configuration, the voltage across second switch 140 may go to zero and the voltage across third switch 145 may be Vin/3. Consistent with embodiments of the disclosure, Va may be inversely proportional to the number of parallel paths (i.e. n) in second circuit portion 110.

Figure 5:
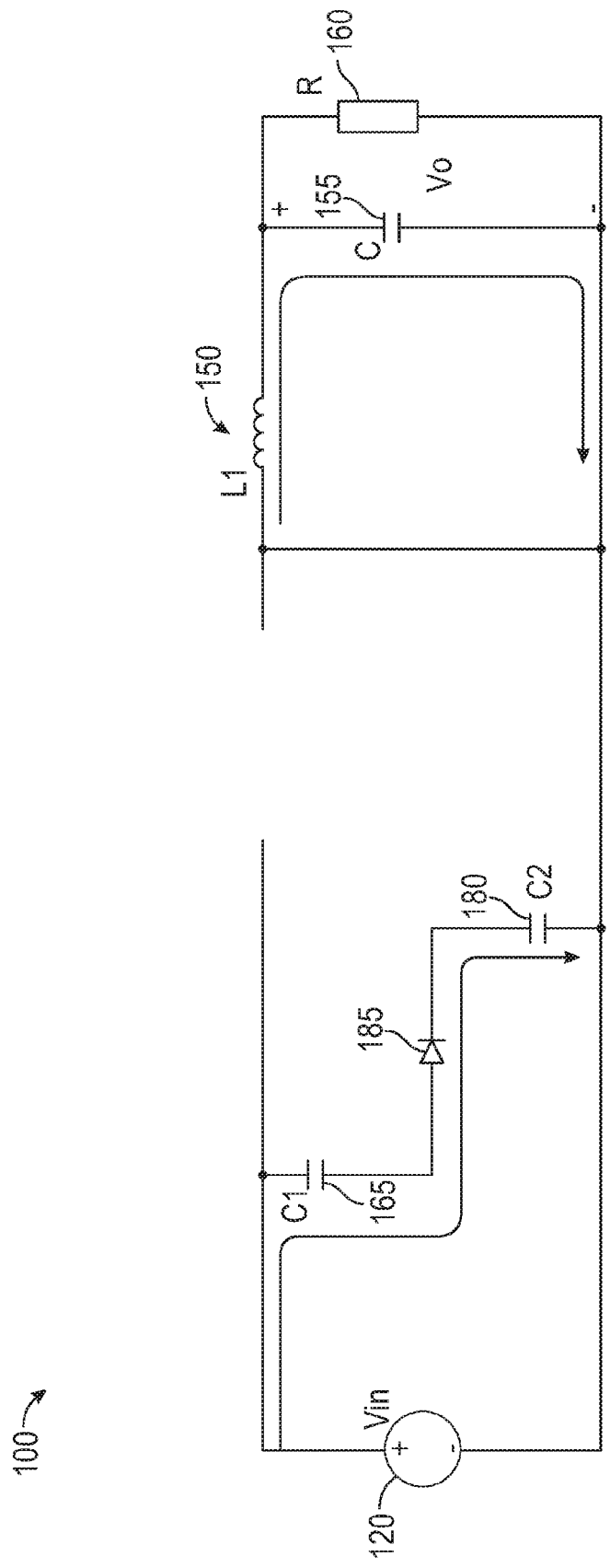
FIG. 5 shows a circuit in a given switch configuration.

At the end of duty cycle D, as shown in FIG. 3, the switching states may be changed for a time period 1-D. For example, first switch 125 may be closed, second switch 140 may be opened, and third switch 145 may be closed. FIG. 5 shows circuit 100 in this switching configuration. In the FIG. 5 switching configuration, inductor 150 may begin to discharge. Also, first parallel path capacitor 165 and second parallel path capacitor 180 may be in series and may charge. The voltage across second switch 140 may rise to Vin and the voltage across third switch 145 may be drop to zero. If the number of parallel paths in second circuit portion 110 comprises 3 (e.g., n=3 as in FIG. 2), first parallel path capacitor 165, second parallel path capacitor 180, and third parallel path capacitor 210 may all be in series and may charge.

The aforementioned process may be repeated in time as shown in FIG. 3. In this way the output voltage ($V_o$) may be ($V_{in}$/n)*D supplied to load 160. As stated above, n may comprise 2 for circuit 100 as shown in FIG. 1. Furthermore, n may comprise 3 for circuit 200 as shown in FIG. 2. As stated above, n may comprise any number, but is based on the number of parallel paths in second circuit portion 110. D may be selected based on a desired voltage level $V_o$ and a given level of the input voltage $V_{in}$.

For example, given the n=2 circuit of FIG. 1, if the desired output voltage ($V_o$) is 1V and the input voltage ($V_{in}$) is 50V, a duty cycle of 0.04 may provide this desired situation without the need of an addition buck in circuit 100. This may comprise a stable duty cycle value for circuit 100. Similarly, given the n=3 circuit of FIG. 2, if the desired output voltage ($V_o$) is 1V and the input voltage ($V_{in}$) is 50V, a duty cycle of 0.06 may provide this desired situation without the need of an addition buck in circuit 200. This may comprise a stable duty cycle value for circuit 200.

An embodiment consistent with the disclosure may comprise an apparatus for supplying a voltage. The apparatus may comprise a first circuit portion, a second circuit portion, and a third circuit portion. The first circuit portion may comprise a voltage supply having an input voltage level ($V_{in}$) and a first switch. The second circuit portion may comprise a plurality of parallel paths. The third circuit portion may comprise a second switch and a third switch. The plurality of parallel paths may supply a portion of the input voltage level when the first switch is open, the second switch is closed, and the third switch is open.

Another embodiment consistent with the disclosure may comprise an apparatus for supplying a voltage. The apparatus may comprise a voltage supply having an input voltage level ($V_{in}$) and a first switch. The apparatus may further comprise a plurality of parallel paths, a second switch, and a third switch. Moreover, the apparatus may comprise an inductor and a load capacitor. An output voltage ($V_o$) supplied across the load capacitor may comprise ($V_{in}$/n)*D where n is a number of parallel paths comprising the plurality of parallel paths and D is a duty cycle at which the first switch, the second switch and the third switch are operated. The plurality of parallel paths may supply a portion of the input voltage level ($V_{in}$) when the first switch is open, the second swatch is closed, and the third switch is open.

Yet another embodiment consistent with the disclosure may comprise a method for supplying a voltage. The method may comprise operating a first switch, a second switch, and a third switch in a circuit at a duty cycle D to supply from the circuit an output voltage ($V_o$) comprising ($V_{in}$/n)*D where $V_{in}$ is an input voltage level at the circuit and n is a number of parallel paths in the circuit. Operating the first switch, the second switch, and the third switch may comprise opening the first switch, closing the second switch, and opening the third switch to supply a portion of the input voltage level $V_{in}$ from the plurality of parallel paths in the circuit. Moreover, operating the first switch, the second switch, and the third switch may comprise closing the first switch, opening the second switch, and closing the third switch to charge capacitors in the plurality of parallel paths and to discharge an inductor in the circuit.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
    a first circuit portion comprising,
        a voltage supply having an input voltage level ($V_{in}$), and
        a first switch in series with the voltage supply;
    a second circuit portion comprising a plurality of parallel paths being in parallel with the first circuit portion, wherein the plurality of parallel paths comprise:
        a first parallel path comprising a first parallel path capacitor, a first parallel path semiconductor device, and a first connection point between the first parallel path capacitor and the first parallel path semiconductor device,
        a second parallel path comprising a second parallel path capacitor, a second parallel path semiconductor device, and a second connection point between the second parallel path capacitor and the second parallel path semiconductor device, and
        a connector diode having a first terminal connected to the first connection point and a second terminal connected to the second connection point, the connector diode configured to allow current flow from the first connection point to the second connection point, the connector diode configured to restrict current flow from the second connection point to the first connection point; and
    a third circuit portion comprising,
        a second switch, and
        a third switch,
            wherein the first parallel path semiconductor device, the second parallel path semiconductor device, and the connector diode are configured to create an electrical path to charge the first parallel path capacitor and the second parallel path capacitor in series through the connector diode when the first switch is closed and the second switch is open; and
            wherein the plurality of parallel paths supply a portion of the input voltage level through a path made through the first parallel path capacitor, the connector diode, and the second parallel path capacitor when the first switch is open, the second switch is closed, and the third switch is open.

2. The apparatus of claim 1, wherein the first switch comprises a metal-oxide-semiconductor field-effect transistor (MOSFET).

3. The apparatus of claim 1, wherein the first parallel path semiconductor device comprises a first parallel path diode.

4. The apparatus of claim 1, wherein the second parallel path semiconductor device comprises a second parallel path diode.

5. The apparatus of claim 1, wherein the plurality of parallel paths further comprise a third parallel path.

6. The apparatus of claim 5, wherein the third parallel path comprises a third parallel path capacitor and a third parallel path semiconductor device.

7. The apparatus of claim 6, wherein the third parallel path semiconductor device comprises a third parallel path diode.

8. The apparatus of claim 1, wherein the supplied portion of the input voltage level is inversely proportional to a number of parallel paths comprising the plurality of parallel paths when the first parallel path capacitor and the second parallel path capacitor are the same size.

9. The apparatus of claim 1, wherein the third circuit portion comprises:
an inductor having a terminal connected between the second switch and the third switch; and
a load capacitor.

10. The apparatus of claim 9, wherein an output voltage ($V_o$) supplied across the load capacitor is ($V_{in}$/n)*D where n is a number of parallel paths comprising the plurality of parallel paths and D is a duty cycle at which the first switch, the second switch, and the third switch are operated.

11. The apparatus of claim 1, wherein the second switch comprises a metal-oxide-semiconductor field-effect transistor (MOSFET).

12. The apparatus of claim 1, wherein the third switch comprises a metal-oxide-semiconductor field-effect transistor (MOSFET).

13. A method comprising:
operating a first switch, a second switch, and a third switch in a circuit at a duty cycle D to supply from the circuit an output voltage ($V_o$) comprising ($V_{in}$/n)*D where $V_{in}$ is an input voltage level at the circuit and n is a number of parallel paths in the circuit, wherein operating the first switch, the second switch, and the third switch comprises;
opening the first switch, closing the second switch, and opening the third switch to supply a portion of the input voltage level $V_{in}$ from the plurality of parallel paths in the circuit, wherein the plurality of parallel paths comprise:
a first parallel path comprising a first parallel path capacitor, a first parallel path semiconductor device, and a first connection point between the first parallel path capacitor and the first parallel path semiconductor device,
a second parallel path comprising a second parallel path capacitor, a second parallel path semiconductor device, and a second connection point between the second parallel path capacitor and the second parallel path semiconductor device, and
a connector diode having a first terminal connected to the first connection point and a second terminal connected to the second connection point, and closing the first switch, opening the second switch, and closing the third switch to:
charge the first parallel path capacitor and the second parallel path capacitor in series through the connector diode, and
discharge an inductor in the circuit, the first switch, the second switch, and the third switch configured to operate substantially simultaneously.

14. The method of claim 13, wherein operating the first switch, the second switch, and the third switch comprises operating the first switch, the second switch, and the third switch wherein each of the first switch, the second switch, and the third switch respectively comprise metal-oxide-semiconductor field-effect transistors (MOSFETs).

15. An apparatus comprising:
a voltage supply having an input voltage level ($V_{in}$);
a first switch;
a plurality of parallel paths, wherein the plurality of parallel paths comprise:
a first parallel path comprising a first parallel path capacitor, a first parallel path semiconductor device, and a first connection point between the first parallel path capacitor and the first parallel path semiconductor device,
a second parallel path comprising a second parallel path capacitor, a second parallel path semiconductor device, and a second connection point between the second parallel path capacitor and the second parallel path semiconductor device, and
a connector diode having a first terminal connected to the first connection point and a second terminal connected to the second connection point, the connector diode configured to allow current flow from the first connection point to the second connection point, the connector diode configured to restrict current flow from the second connection point to the first connection point;
a second switch, the first parallel path capacitor and the second parallel path capacitor configured to charge in series through the connector diode when the first switch is closed;
a third switch;
an inductor; and
a load capacitor.

16. The apparatus of claim 15, wherein an output voltage ($V_o$) supplied across the load capacitor is ($V_{in}$/n)*D where n is a number of parallel paths comprising the plurality of parallel paths and D is a duty cycle at which the first switch, the second switch and the third switch are operated.

17. The apparatus of claim 15, wherein the plurality of parallel paths supply a portion of the input voltage level ($V_{in}$) when the first switch is open, the second swatch is closed, and the third switch is open.

* * * * *